US008839206B2

(12) United States Patent
Kalra

(10) Patent No.: US 8,839,206 B2
(45) Date of Patent: Sep. 16, 2014

(54) TIME-BASED BREAKPOINTS IN DEBUGGERS

(75) Inventor: Mohit Kalra, New Delhi (IN)

(73) Assignee: International Business Machines Corporation, Armonk, NY (US)

(*) Notice: Subject to any disclaimer, the term of this patent is extended or adjusted under 35 U.S.C. 154(b) by 854 days.

(21) Appl. No.: 12/904,361

(22) Filed: Oct. 14, 2010

(65) Prior Publication Data

US 2011/0029958 A1 Feb. 3, 2011

Related U.S. Application Data

(63) Continuation of application No. 10/229,186, filed on Aug. 26, 2002, now abandoned.

(51) Int. Cl.
*G06F 9/44* (2006.01)
*G06F 11/36* (2006.01)

(52) U.S. Cl.
CPC .......... *G06F 11/362* (2013.01); *G06F 11/3644* (2013.01)
USPC .......... 717/129

(58) Field of Classification Search
CPC .......... G06F 11/362
USPC .......... 717/124–135
See application file for complete search history.

(56) References Cited

U.S. PATENT DOCUMENTS

| | | | | |
|---|---|---|---|---|
| 5,799,178 A * | 8/1998 | Walker et al. | ........ | 713/502 |
| 2004/0040013 A1 | 2/2004 | Kalra | | |

FOREIGN PATENT DOCUMENTS

| | | |
|---|---|---|
| JP | 57150046 | 9/1982 |
| JP | 60222947 | 11/1985 |
| JP | 02266441 | 10/1990 |
| JP | 03040143 | 2/1991 |
| JP | 05035526 | 2/1993 |
| JP | 07271632 | 10/1995 |
| JP | 10049401 | 2/1998 |
| JP | 2000148536 A | 5/2000 |

OTHER PUBLICATIONS

Tomach et al, Debuggable Concurrency Extensions for Standard ML, ACM, pp. 120-131, 1991.
Tomach et al, Debugging Standard ML Without Reverse Engineering, ACM, pp. 1-12, 1990.
Cadence Design Systems, Inc., Verilog-XL Reference, Chapter 24, pp. 1-33, 1997.
Parallax, Introduction to Assembly Language Programming with the Scenix SX Microcontroller, Version 1.2, pp. 1-128, 1999.

(Continued)

*Primary Examiner* — Ted T Vo
(74) *Attorney, Agent, or Firm* — Patrick J. Daugherty; Driggs, Hogg, Daugherty & Del Zoppo Co., LPA

(57) ABSTRACT

A time-based breakpoint facility is provided for debugging a program upon expiration of a timer. More particularly, encountering a break exception during an execution of a program results in determining if the break exception is raised by a trigger or by a breakpoint. If the break exception is raised by the trigger, steps include breaking the program execution, starting a timer and resuming the program execution without passing control to a user interface thread until the started timer expires. If the break exception is raised by the breakpoint, steps include breaking the program execution, passing control to the user interface thread, performing a debugging operation, and resuming the program execution upon indication of the user interface thread.

17 Claims, 9 Drawing Sheets

(56) References Cited

OTHER PUBLICATIONS

Non-final Office action (mail date May 23, 2005) for U.S. Appl. No. 10/229,186, filed Aug. 26, 2002.

Final Office action (mail date Nov. 4, 2005) for U.S. Appl. No. 10/229,186, filed Aug. 26, 2002.

Non-final Office action (mail date May 5, 2006) for U.S. Appl. No. 10/229,186, filed Aug. 26, 2002.

Final Office action (mail date Oct. 20, 2006) for U.S. Appl. No. 10/229,186, filed Aug. 26, 2002.

* cited by examiner

TIME-BASED BREAKPOINTS IN DEBUGGERS

CROSS-REFERENCE TO RELATED APPLICATION

This application is a continuation of application Ser. No. 10/229,186, filed Aug. 26, 2002.

FIELD OF THE INVENTION

The present invention relates to the use of breakpoints in debuggers, particularly the use of debuggers to initiate time-based breaks.

BACKGROUND

Debuggers are tools for developers used when coding and maintaining existing code. Existing debuggers provide many facilities to programmers, to help programmers remove existing bugs, or understand the operation of a program. One existing feature of debuggers is means of inserting what are referred to as breakpoints.

Table 1 tabulates a list of different types of breakpoints, and an indication of how they operate. Execution of the program stops at the breakpoint so that the programmer can step into the code line-by-line, or resume execution of the program as required. The programmer can determine the values of program variables at each line of code that is executed, when the breakpoint is operative.

Breakpoints are the most used feature of any debugger. Current debuggers provide many kinds of breakpoints. The debugger generally stops the program execution, depending on the type of breakpoint reached.

TABLE 1

| Type of Breakpoint | Reason for Stopping Program Execution |
|---|---|
| Normal Breakpoints: | Whenever the line is reached. |
| Storage breakpoints | Whenever a specified memory location is written to, read or accessed. |
| DLL load breakpoints | Whenever a DLL is loaded in memory. |
| Conditional breakpoints | Whenever a condition is reached (for example, the value of a variable i becomes greater than 50) |
| Temporary breakpoints | Whenever the line is reached though, unlike normal breakpoints, temporary breakpoints are disabled when once they have been reached. That is, temporary breakpoints are one-time use breakpoints only. |
| Regex-based breakpoints | These breakpoints are for functions that match a given regular expression. |

BRIEF SUMMARY

In one embodiment, a method is provided for debugging a program upon expiration of a timer. The method includes encountering via a processor a break exception during an execution of a program and determining if the break exception is raised by a trigger or by a breakpoint. If determined that the break exception is raised by the trigger, the method includes breaking the program execution, starting a timer and resuming the program execution without passing control to a user interface thread until the started timer expires. If determined that the break exception is raised by the breakpoint, the method includes breaking the program execution, passing control to the user interface thread, performing a debugging operation, and resuming the program execution upon indication of the user interface thread.

In another embodiment, a computer system that debugs a program upon expiration of a timer includes a processing unit, computer readable memory and a computer readable storage system. Program instructions on the computer readable storage system cause the processing unit to first program instructions to determine if a break exception encountered during an execution of a program is raised by a trigger or by a breakpoint. If determined that the break exception is raised by the trigger, the program instruction are to break the program execution, start a timer and resume the program execution without passing control to a user interface thread until the started timer expires. If determined that the break exception is raised by the breakpoint, the program instruction are to break the program execution, pass control to the user interface thread, perform a debugging operation and resume the program execution upon indication of the user interface thread.

In another embodiment, a computer program product that debugs a program upon expiration of a timer includes program instructions to determine if a break exception encountered during an execution of a program is raised by a trigger or by a breakpoint. If determined that the break exception is raised by the trigger, the program instructions are to break the program execution, start a timer and resume the program execution without passing control to a user interface thread until the started timer expires. If determined that the break exception is raised by the breakpoint, the program instructions are to break the program execution, pass control to the user interface thread, perform a debugging operation and resume the program execution upon indication of the user interface thread.

DETAILED DESCRIPTION

Figure 1:
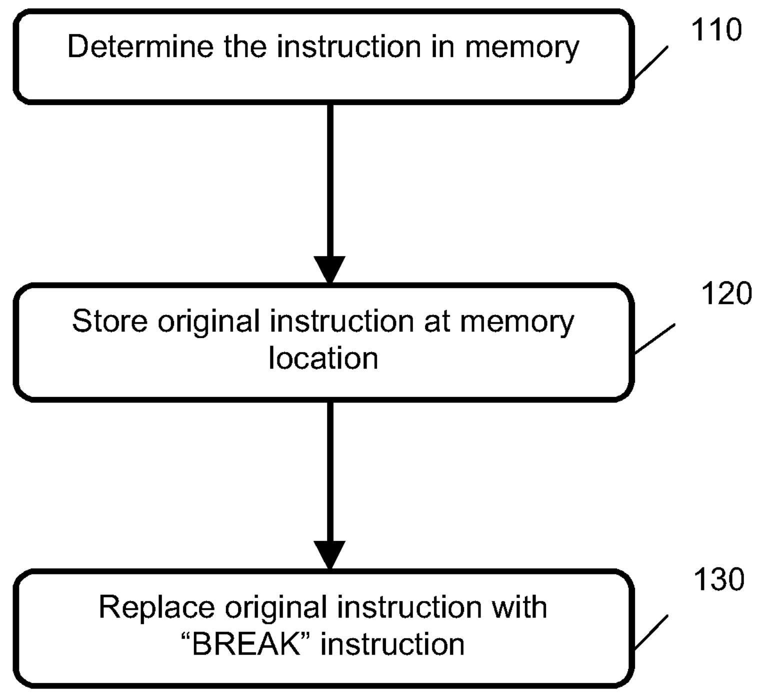
FIG. 1 is a flowchart of steps presenting how time-based breakpoints are inserted in the executable image of the program in memory.

Debugging describes a process of eliminating bugs from a program by observing memory contents, or by observing execution flow of the program. The debugging process helps to locate and correct logical errors that go undetected during compilation of source files. A debugger is a tool that facilitates this process, and breaks program execution at locations in code, as instructed by a programmer. This type of debugging technique is called interactive debugging, in which the debugger breaks execution of the program being debugged and allows a programmer to interact with the debugger through a user interface.

The technique is also called breakpoint debugging, because the debugger suspends program execution by allowing programmer to set the breakpoints in the program, and allows the programmer to observe and alter the state of a program.

One disadvantage associated with existing debuggers is that there are no breakpoints that stop program execution after a certain time has elapsed. That is, there is no breakpoint that comes into effect only after a certain time period has elapsed. There are two workarounds used to achieve the same effect. These are briefly outlined directly below.

A first workaround involves manually keeping track of the time, and then breaking the program when the specified time period has elapsed. This technique is inaccurate, especially when the time delays are very small. Further, a programmer is required to keep track of time manually. Hence, this technique is relatively cumbersome, and is prone to error. For large time delays, if the programmer fails to break the program execution, the whole process may need to be repeated once again.

A second workaround involves reprogramming the original code with additional code, such as the code presented in Table 2.

TABLE 2

```
if ( time_has_elapsed( ) )
  1. int x = 5; /*Dummy Statement*/
```

If the code is recompiled with the additional statements presented in Table 2, and a breakpoint is set at the "Dummy Statement", the same effect is obtained.

A particular disadvantage of this technique, however, is that the source files need to be changed. If the build procedure takes a long period, then the process of changing the code and rebuilding is undesirable. Moreover, programmers must take care to remove the above code for release or "production-ready" builds.

A program state at any instant comprises register values, and memory contents that are used to store the data of the program. The debugger allows programmers to set breakpoints directly in the source code, for speed and simplicity. The source code is mapped to machine instructions by using additional information stored in the program file, referred to as debugging information. This debugging information may be included in the same file or as a separate file.

Compiling the source files with an appropriate option usually generates this debugging information. Thus, debuggers are capable of mapping source code information to the corresponding machine level instructions. The source code is contained in source files, whereas machine instructions are stored in the program's executable file. The compilation process, followed by linking, converts source code instructions to machine instructions. Part of the debugging information that is generated by the compilation process is used to map the source level instructions to the machine instructions and vice versa.

The debugger reads this information from the file and puts the information in an appropriate data structure such as an array of structures, a tree, a hash table, etc. This data structure is used to associate the source code with the machine code when the debugger inserts the breakpoints in the executable image of the program in memory.

Breakpoints are not set at compile time but when the program is in memory as the debugger executes. The breakpoints are set in memory when a program starts. A new breakpoint can also be inserted when the program suspends execution and waits for the programmer to complete debugging operations, such as examining the memory or setting new breakpoints. This process of setting breakpoints is performed through the user interface that may also store the breakpoint list when the programmer exits the debugger, so that the breakpoints are not lost when the program is debugged during the next session.

The process of debugging involves one program controlling the execution of another program. The controlling program is the debugger and the program being controlled is the program that is being debugged. This is form of a master-slave relationship, and the debugger controls the flow of execution according to the programmer's needs. Thus, the debugger should be capable of accessing, reading, and writing to the child program's memory. The debugger may wish to read or write machine instructions, register values, or variables of the child program. Apart from reading the memory, and reporting the state of the program to the programmer, the debugger may also wish to alter the contents of the child's memory. This ability is essential to set breakpoints, or alter memory when the programmer requests the debugger to write to some variables or registers using the user interface.

Modern operating systems operate the processor in a special mode called "protected mode". One feature of protected mode is that one program is not permitted to access the memory of another program to avoid memory corruption. The operating system provides a mechanism for programs to communicate with each other. This facility to let two processes communicate is termed interprocess communication and programs use it extensively. There may, for example, be a need for one program to notify another program that an event has taken place. The event can be a window resizing, a resource being released, etc.

These events are communicated by operating system signals or messages. A signal is a mode of interprocess communication. An important event is to notify the child process to suspend execution immediately. Any process can raise the signal but this is of use to debuggers that may want to suspend the program execution immediately at any given point of time. This is different when the program execution suspends because of a break instruction that raises an exception. Exception-based suspension of processes allows breakpoints to be implemented, as described below.

In Unix-based operating systems, raising a signal called SIGSTOP stops a process at that instant. The process suspends execution immediately, as soon as the signal is delivered to the process. Corresponding messages exist on different operating systems. As mentioned earlier, signals are a mechanism by which two processes can communicate with each other. Therefore, one process sends a signal and another accepts the signal. The signal is usually routed through the operating system that ensures that the signal is sent to the correct process. The kernel also sends signals to processes to notify them of various events such as an invalid memory access, an input output error, etc. Thus, current operating systems provide a mechanism by which one process can notify another process to suspend its execution until further notice.

Operating systems maintain system time with the help of a hardware clock. Internally, the operating system kernel uses the hardware clock to schedule processes in a multiprocessing system. The kernel also provides system calls to the programs for any time-related functionality. The user can use these calls to set the time, or obtain the system time, or to be notified regularly after a certain time interval.

The operating system can also provide, for the sake of accuracy, an interface to the Real Time Clock (RTC) on the motherboard hardware. The programs can communicate with the RTC directly for higher precision. Programs can thus request the operating system or the RTC to inform them when a specified period elapses. These timers can be "one-shot" timers that inform the process only once, or periodic timers that signal to a process at regular intervals, when a specified time interval elapses.

As described above, a debugger controls a child process being debugged. A debugger also intercepts signals that are sent to the child process, to gain complete control over the child process. The debugger receives all signals that are sent to the child process, and routes them to the child depending on whether instructed by the programmer. When some instruction generates an exception in a child process, the corresponding signal is first sent to the debugger. This mechanism detects if a break instruction is reached. The break exception notifies the debugger that the child process has suspended execution, because the child process has executed an instruction at which the programmer had set a breakpoint using the debugger.

Breakpoints are implemented both in hardware and software. Debuggers usually use both these kinds of implementations collectively known as breakpoints. Some hardware provides a feature of setting breakpoints by making use of debug registers that are a part of the chip. These kinds of breakpoints are known as hardware breakpoints and can be of two kinds: (i) data breakpoints or (ii) instruction breakpoints.

Data breakpoints break program execution when a specified memory location or input output port is accessed. Instruction breakpoints stop program execution whenever the specified location in code is reached. Breaking execution transfers control to the debugger procedure. This is achieved using hardware.

For example, in Intel x86 central processing unit architectures, there are eight debug registers (D0 through D7). Four registers (namely D0, D1, D2, D3) are used to set breakpoints. These registers store a 32 bit linear address for which the breakpoints are to be set. Registers D4 and D5 are used for advanced debugging. Registers D6 and D7 respectively act as status and control debug registers.

To set an instruction breakpoint, the address of the instruction is stored in any of the unused debug registers D0 through D3. D7 is set appropriately to indicate that the breakpoint is an instruction breakpoint. The hardware throws a debug exception when the processor attempts to execute the instruction at the specified address. The exception is thrown before the instruction is executed and the debug procedure is required to clear the breakpoint so that the exception is not raised again.

By contrast, in the case of data breakpoints, a trap-exception is generated only after a memory location or an input/output port is accessed. The hardware also provides machine instructions to single step the child program.

One problem with hardware breakpoints is that this feature is hardware dependent, and some architectures may not support hardware breakpoints. Hardware breakpoints are limited in number and consequently debuggers implement software breakpoints. Software breakpoints are breakpoints that are implemented by changing the executable code of the program being debugged. This is done in memory, and not on the executable file. The code of the program being debugged is "patched" by the debugger.

FIG. 1 flowcharts steps involved in inserting breakpoints in an executable image of a program in memory, when the program is run in a debugger.

When a breakpoint is set at a line of code, the debugger performs the following steps presented in Table 1 below.

TABLE 1

| | |
|---|---|
| Step 110 | The debugger determines the instruction for which the breakpoint is requested. |
| Step 120 | The debugger stores this original instruction at a location in computer memory so that the original instruction can be subsequently retrieved. |
| Step 130 | The debugger stores the address of the original instruction in a special hardware-based debug register, if the hardware supports such a register. If the hardware does not support such a register, the debugger inserts an instruction in the program code in memory that will raise an exception when executed. In both cases, an exception is raised and control passes to the debugger thread. |

Breakpoints are hit or reached whenever a break instruction raises an exception. Control then passes to the debugger procedure. The debugger informs the user that a breakpoint has been reached. When the user continues execution, the debugger replaces the break instruction with the original instruction (that the debugger previously stored as noted above) and then executes the instruction. After executing the instruction, the debugger stores the original instruction once again and replaces the original instruction with the break instruction, so that the breakpoint is not lost. This is equivalent to disabling the breakpoint for one instruction and then enabling the breakpoint once the original instruction has been executed. Usually all breakpoints retain the break instruction once the breakpoint is hit, but this behavior may differ for different kinds of breakpoints. For example, temporary breakpoints do not replace the original instruction with a break instruction when the breakpoint is hit, because temporary breakpoints are one-time use breakpoints and therefore they do not require the break instruction to be retained.

Figure 2:
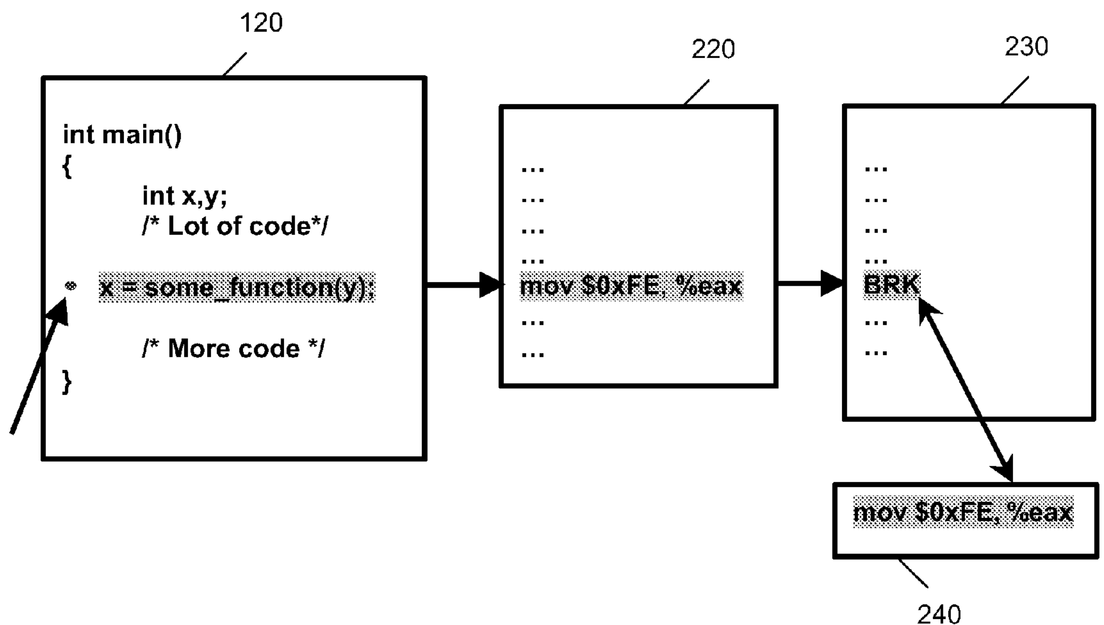
FIG. 2 is a schematic representation presenting how time-based breakpoints are inserted in the executable image of a program when it is run in the debugger.

FIG. 2 schematically represents an example of the procedure flowcharted in FIG. 1. A program code fragment 210 includes a breakpoint. Subsequently, the debugger determines where in the corresponding machine instructions 220 the breakpoint is to be placed. In FIG. 2, an example assembler instruction is used for ease of understanding. The debugger then replaces the relevant machine instruction 240 with a breakpoint 230, and saves the original instruction 240 in memory.

As explained above, the debugger needs to patch code and insert code that throws exceptions. This may be done directly by the debugger. Many operating systems do not allow a process to access the address space of another process. The operating system usually provides a system call (which is an interface to request a service from the kernel) to allow debuggers to patch the code and read the variables of the program that is being debugged. The system call acts as the mechanism to control the child program running in the debugger. This allows the debugger to intercept the exceptions and the signals to gain full control over the program.

Debuggers use the ptrace( )system call that is provided by almost all Unix clones. the ptrace( )system call permits the debugger to read or write the memory, the registers, watch points (data breakpoints in hardware), etc in the child's address space. The debugger can set software breakpoints by changing the code in memory, or the debugger can set the hardware breakpoints by setting the registers of the child process.

When a program is run in a debugger, the debugger acts as the parent program and spawns as its child the program being debugged. Thus, the debugger and program being debugged have a parent-child relationship. The prime purpose of the debugger is to control and observe the child program. Therefore, after spawning the child process, the debugger waits while the child program is running. The operating system stops the child program each time a signal is delivered to the child program. The operating system then notifies the parent program (in this case the debugger) that the child has stopped. The debugger can query the reason why the child stopped.

When a programmer inserts breakpoints and runs the program in the debugger, the debugger spawns the program as its child program and waits to be informed by the operating system. When a breakpoint is reached, the program raises an exception and the child program is moved to a stopped state. The operating system informs the debugger that the child program has stopped. Thus, on reaching a breakpoint, the control is passed from the child program to the debugger. When a child is running, the debugger waits infinitely for some event to take place in the child program. When the control is passed to the debugger, the child process is always in a stopped state.

In summary, there exist mechanisms by which the following functionality can be achieved.

1. A debugger can map machine instructions to the source code and vice-versa by using debugging information that is generated during compile time.
2. A process is capable of suspending execution of another process whenever the process chooses to do so. To achieve this end, the process uses a mechanism to notify the other process. For example, one process may notify another process by using signals that that are provided by the operating system.
3. The debugger is capable of completely controlling the child process. This is a basic requirement for any interactive debugger.
4. The operating system provides timing information to a process by interface-called system calls, or by allowing the process to communicate with the hardware clock directly.
5. The debugger can insert and disable breakpoints in hardware or in software by accessing and altering the address space or the registers of the child process. This can be done either by directly altering the child's memory (or registers), or by requesting the operating system to do so.

The described debugger allows program execution to be stopped at a certain time "when" the programmer desires to do so. Such a breakpoint type, where time is the parameter to stop the program execution, is termed herein a time-based breakpoint.

Time-Based Breakpoints

As described earlier, breakpoints are used to suspend program execution in an interactive debugger so that the programmer can query the program's state, and the flow of execution. This is done by setting special registers in hardware, or by patching the memory in software. Insertion of time-based breakpoints involves detecting when to start a timer, keeping track of the time that has elapsed, and then breaking the execution of the child program when appropriate.

Like most other breakpoints, a time-based breakpoint is associated with a line of code. When the relevant line of code is executed, a corresponding timer is started. The execution of the line of code acts as a trigger for the timer. Once the line is executed, the trigger is activated and the timer is started. The program execution stops once the time has elapsed. The details of obtaining such an effect are explained below.

Triggers

A program is "run" in the debugger when the programmer provides a command to the debugger through the user interface. This command may be "run" or "go" typed on the command line provided by the debugger, or can be in the form of a shortcut key or a mouse-click action. When the program is ready to run, the debugger sets the breakpoints in the executable image in memory by the mechanisms described above.

The user sets a time-based breakpoint in the source file and the debugger determines the instruction that acts as a trigger to start the timer. The process of checking the location of the instruction being executed in the child process and then comparing this location with the trigger location can be relatively time-consuming and inefficient.

Accordingly, an alternatively technique is used. Instead of determining whether a trigger has been reached, the child process notifies the parent process whenever the child process reaches an instruction where the trigger has been set.

Figure 3:
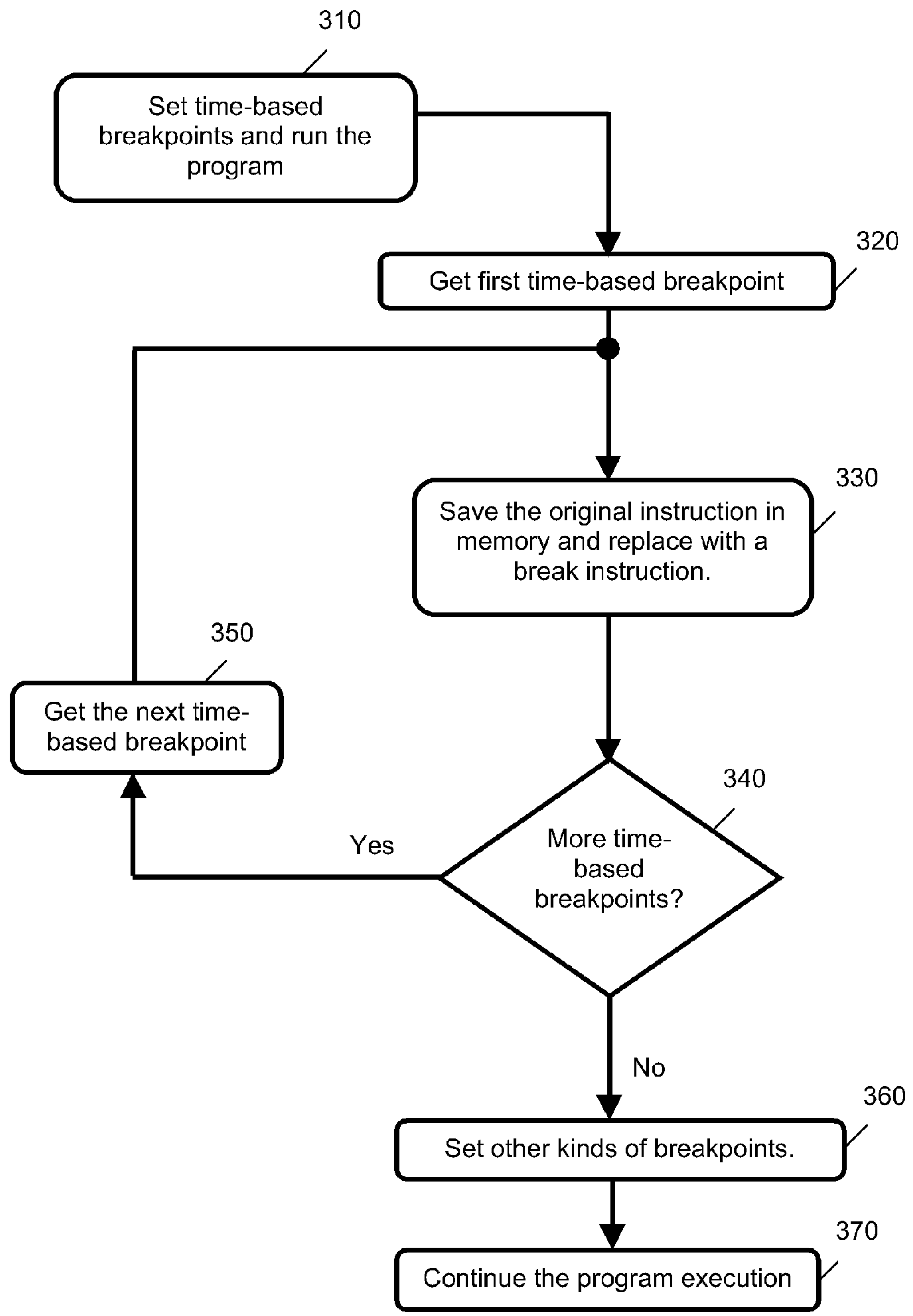
FIG. 3 is a flowchart presenting how triggers are inserted in the executable image of a program in memory.

FIG. 3 flowcharts steps involved in how triggers are inserted in an executable image of the program in memory. The technique used is similar to that used for breakpoints, and therefore the steps used to insert a trigger are similar to those used for inserting a breakpoint. These steps of FIG. 3 are tabulated in Table 2 below, using correspondingly numbered steps.

TABLE 2

| | |
|---|---|
| Step 310 | The programmer sets a time-based breakpoint by using the user interface of the debugger, and then starts the program execution if the program is being started for the first time. The program continues execution if the program was suspended due to a breakpoint. |
| Step 320 | The time-based breakpoint is set in the source code and the debugger determines the corresponding instruction in the image of the executable program. This instruction acts as the trigger for the breakpoint and is referred to as a "trigger instruction" that is responsible for starting the timers. |
| Step 330 | When the program is continued or run, the debugger saves the instruction stored at the location of the trigger in its own memory. The debugger then replaces the instruction with a break instruction. Optionally, the debugger can also use hardware |

TABLE 2-continued

| | |
|---|---|
| | registers to store the address of the trigger instruction. In this case, the hardware notifies the debugger's procedure whenever the trigger instruction is about to be executed. |
| Step 340 | A determination is made whether further breakpoints exist. If further breakpoints do exist, perform step 350. If there are no further breakpoints, proceed to step 360. |
| Step 350 | If there are further time-based breakpoints, the debugger determines the next time-based breakpoint, and obtains the time-based breakpoint. Processing then next returns to step 330. |
| Step 360 | If there are no further time-based breakpoints, other kinds of breakpoints can be set. |
| Step 370 | Continue executing the program. |

As the process described above with reference to FIG. 3 is very similar to setting breakpoints, the debugger can set triggers without difficulty. When the trigger instruction is reached while executing the program in the debugger, program execution breaks to allow the debugger to start the timer, and not for the programmer to perform the debugging operations. Suspension of program execution is temporary. The programmer who is using the debugger does not notice any difference in the execution of the program.

The trigger instruction starts the timer of the breakpoint, and then resumes program execution.

Figure 4:
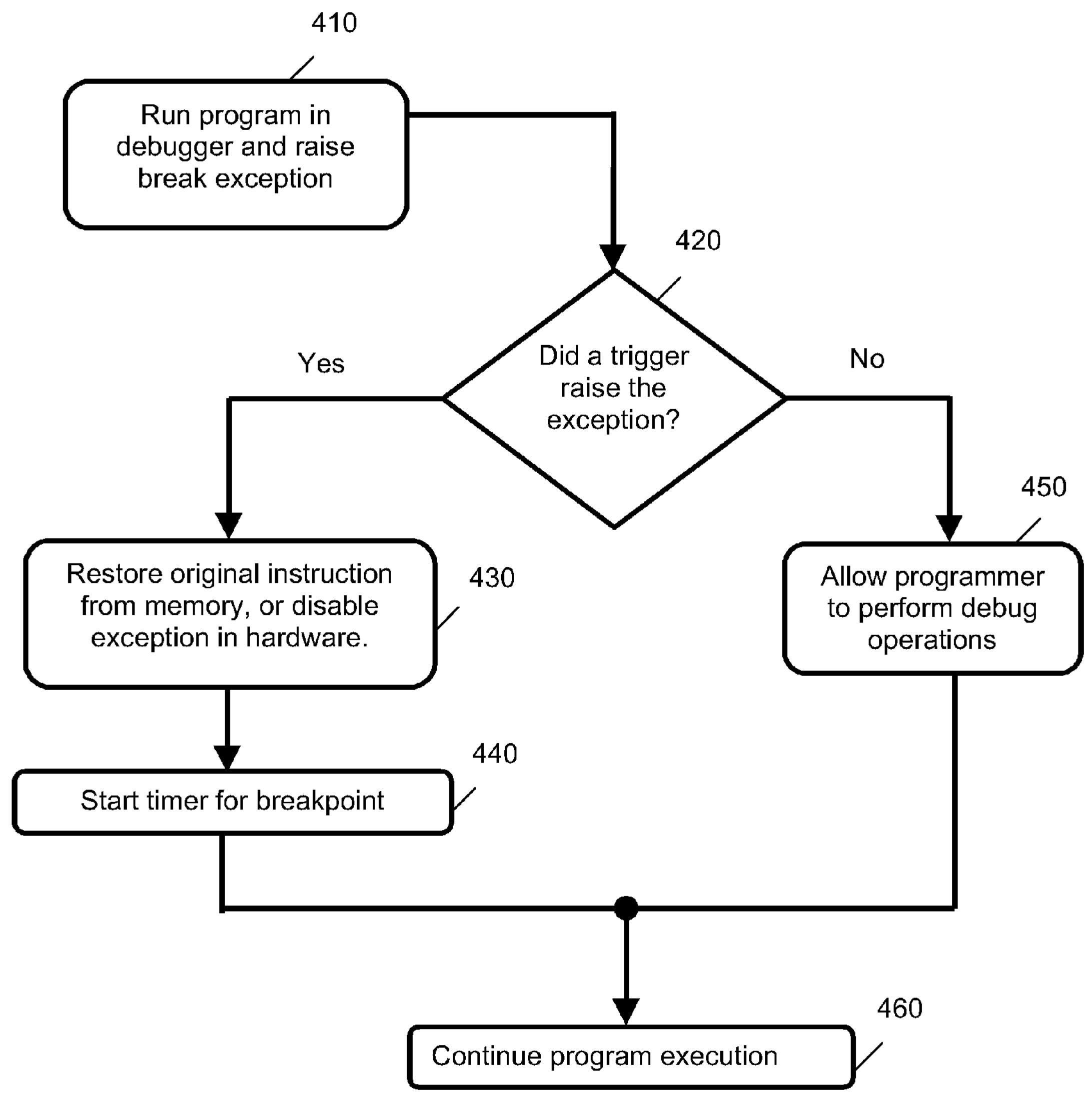
FIG. 4 is a flowchart of steps taken by a debugger when a trigger is encountered during the program execution.

FIG. 4 flowcharts steps involved when a trigger is encountered during the program execution. These steps are described in Table 3 below, correspondingly numbered steps. When a trigger is reached, the debugger raises a break exception, which is similar as in the case of a normal breakpoint.

Therefore, the debugger determines whether the break exception is raised by a trigger or by a breakpoint. If the trigger raises the break exception, then the timer is started and the program execution is continued. If a breakpoint raises the break exception, then the debugger allows the programmer to perform the usual debugging operations.

TABLE 3

| | |
|---|---|
| Step 410 | When a child throws a break exception, the debugger is notified of the exception. |
| Step 420 | A determination is made whether a trigger raised the exception. If a trigger did raise the exception, perform step 430. If the exception was not raised by a trigger, perform step 450. |
| Step 430 | If the instruction where the exception took place is a trigger instruction, then the break instruction replaces the original instruction in the case of a software breakpoint. The breakpoint is disabled for the instruction through the registers in case of a hardware breakpoint. |
| Step 440 | Start the timer for the breakpoint in the debugger. Proceed to step 460. |
| Step 450 | If the exception is due to a breakpoint, then allow the programmer to perform usual debugging operations. |
| Step 460 | Resume execution of the program. |

The debugger needs to perform a simple search in its list of time-based breakpoints in order to determine whether a break instruction is a trigger or a breakpoint.

The above-described steps enable programmers to set one-time use triggers only. That is, the trigger are lost once the trigger is reached, unless the program is restarted. As an extension of the above trigger, a recurring trigger can be implemented by reinserting the trigger, preference to performing above described in step 430, as described in Table 4 below.

TABLE 4

| | |
|---|---|
| Step 530 | Replace the break instruction with the original instruction in the case of a software breakpoint. Disable the breakpoint for the instruction through the registers in case of a hardware breakpoint. Execute the single instruction and then reinsert the break instruction at the trigger location, using the same described techniques by which triggers are set in an executable image of the program. |

Figure 5:
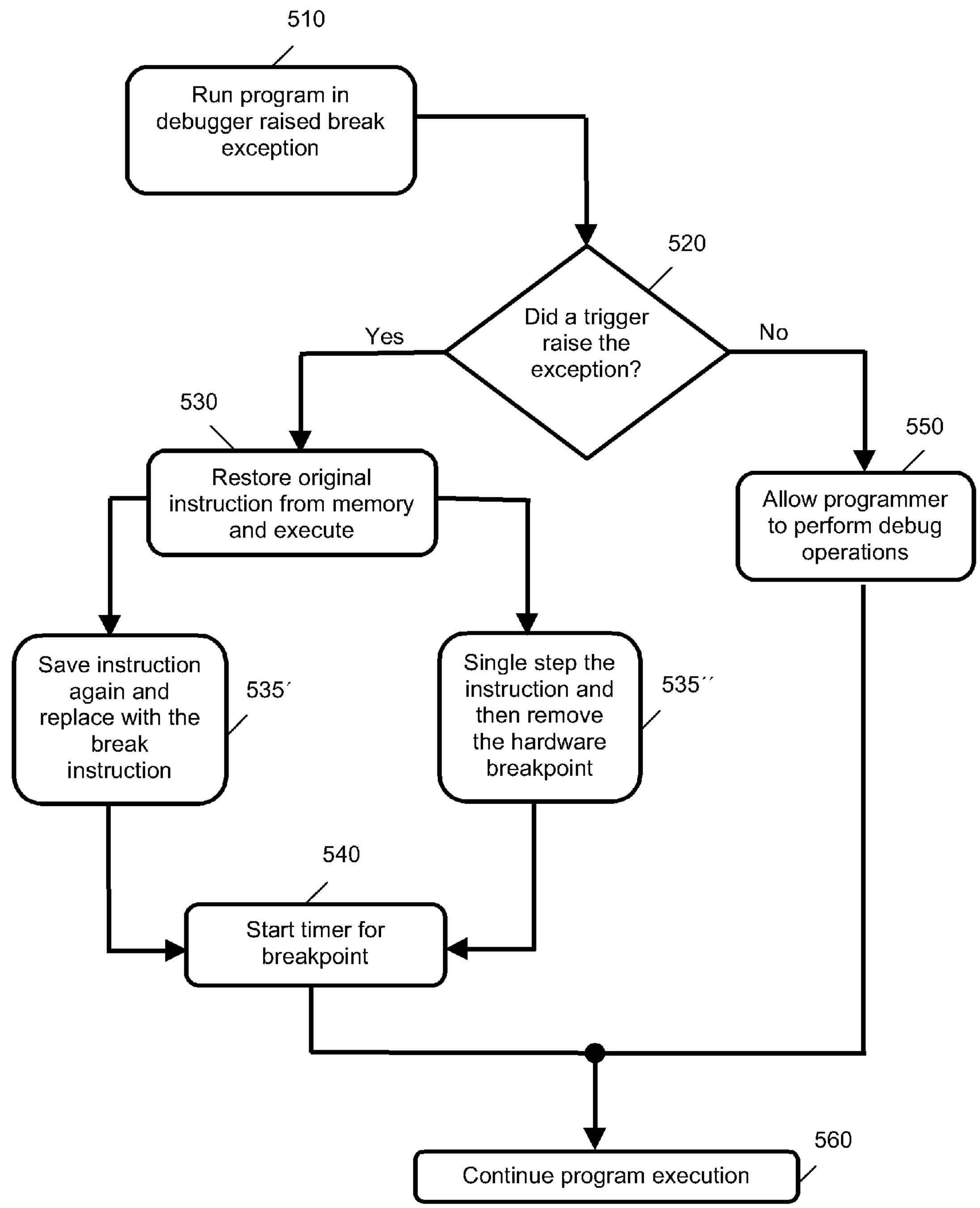
FIG. 5 is a flowchart of steps taken by a debugger when a trigger is encountered during program execution, including steps involved in installing a recurring trigger.

FIG. 5 flowcharts steps additional steps needed to install a recurring trigger. For recurring triggers, a policy is implemented concerning how timers should be started, if the timers are already running. The debugger may choose to neglect such triggers, or may restart a respective timer. Alternatively, different timers may be maintained for each trigger. Such policy decisions, and the implementation of a recurring trigger are simple extensions of the described "one-time use" trigger.

FIG. 5 involves steps 510 to 520 and 540 to 560 that correspond with steps 410 to 420 and 440 to 460 described with reference to FIG. 4. That is, FIG. 5 involves all the steps of FIG. 4, except for step 430, which is replaced with step 530 as described in Table 4 above.

Internally, breakpoints and triggers force the program being debugged to raise exceptions so that the debugger can be notified of the event. Both triggers and breakpoints insert a break instruction to achieve this effect. Triggers and breakpoints tend to differ once the break instruction is hit. On one hand, breakpoints cause the debuggers to pass the control to the user interface thread, so that the programmer can examine the memory contents and register values. The program execution resumes only when the programmer chooses to do so. Therefore, the programmer is well aware whenever a breakpoint is hit.

By contrast, triggers start timers internally and continue program execution without passing control to the user interface thread. The program execution resumes as soon as the timers for the time-based breakpoints are started. Continuing program execution is not dependent on a programmer's inputs, and there is no loss in functionality of the trigger if the user is not informed when the trigger is hit. Thus, breakpoints actually break the program execution for the programmer, whereas the triggers break program execution momentarily so that the timers can be started.

Timers

The timer is the entity in time-based breakpoints that keeps track of time elapsed since the trigger was first reached. The timers are implemented using an external clock, either directly or via the operating system that interfaces with the clock.

A timer can provide different ways in which the time elapsed is accounted, the calculation of time during a debug operation and the action to be performed when the specified time elapses. Each of these aspects is described below.

The programmer selects the technique by which he or she wishes to calculate time, once the timers have been started. The selected technique depends entirely on the programmer's particular needs.

In multiprogramming environments, a program is usually not allocated the full processing time of the CPU (Central Processing Unit). The program instead only uses a fraction of the total available time, referred to as a "time slice". Time slicing gives an appearance that many processes are running concurrently, even if there is only one CPU.

Different examples of techniques for time calculation are as follows:

(i) The "wall-clock" time tracks of the time elapsed. The time calculation is performed as if an external entity is using an accurate stopwatch to calculate the time elapsed.

(ii) The calculation is based on time elapsed while the program is in execution. This means that the time calculation is done only while the process is getting its share of the time slice. This is analogous to an external accurate stopwatch that only runs when the process (being debugged) is allocated CPU time. When the other processes are getting CPU time, the stopwatch is in a paused state.

(iii) The time elapsed while the program is in execution and the time taken by the kernel to fulfill requests on behalf of the process. The kernel does many low-level jobs to fulfill the requests of a process. This is done on behalf of the process to avoid low level corruption (such as corruption of memory, files on a hard disk etc.). This technique is similar to technique (ii), but also includes the time that the kernel is allocated for the process.

(iv) Time calculated based on the "uptime" of the system. This represents the time elapsed since the system was booted.

The debugger requires the operating system to provide a facility for time calculation as the operating system couples with the clock and provides an interface to the user space programs. The kernel can provide techniques (ii), (iii) and (iv), because the operating system is responsible for scheduling the processes or keeping track of the time since the system booted.

Timing information can also be obtained by other techniques other than from the operating system. For example, in hardware, the timer may signal the chip when the time has elapsed. This event may actually set the bit in the debug registers to enable the breakpoint.

The above described four techniques are existing techniques of using the timer facility provided by the kernel. These kinds of timing accounting methods are used by existing operating systems, such as Linux. Other time accounting techniques may be included depending on the need of the debugger and the facilities that are available to implement such techniques.

A timer can be of two kinds—periodic or "one-shot". A one-shot timer informs a process that the timer has expired only once, whereas a periodic timer does the same repeatedly. The choice of the kind of timer depends on what is to be implemented. In the case of a time-based breakpoint, a regular check is made on the time elapsed, or the CPU time consumed by a process, or even the uptime of a system.

When the debugger stops execution of a child process, the child process is not allocated the time slice until the debugger runs the process again. Therefore, operating systems usually do not provide alarm mechanisms based on the CPU time of the child process. Alarms are notifications sent to a process when a timer expires.

Alarms are provided for "wall-clock" timers because the clock is always running, irrespective of the process that is allocated the CPU time. So, if the time accounting technique is other than the "wall-clock" time accounting technique, then a periodic check is made to determine whether the time has elapsed.

To provide greater flexibility to the programmer, a debugger may automatically pause the timer when the debugging operations are performed. This can be a very useful feature, if the programmer does not want to include the time spent in debugging in calculating the total time elapsed for the timer of the breakpoint. The precision of such a calculation can vary for different implementations.

A periodic timer can be used for such calculations, as described herein. A periodic timer may also be needed when the time elapsed is based on the CPU time a process is allocated, because the kernel does not inform the debugger when the timer has expired. To this end, the debugger periodically checks the CPU time that the process is allocated. An optimal solution for breakpoint timers is to have one timer with each breakpoint. Each such timer is desirably able to make a call to a function of its choice.

In practice, due to limitations and overheads of multiple timers, a main periodic timer can be used to keep track of the expiry times for all breakpoints. Henceforth, such a periodic timer is called a delta timer because the delta timer is allocated a pulse every delta units of time, so that the timer can either keep track of the time for the debugger, or make periodic checks of whether other timers have expired.

Therefore, "starting a timer for a breakpoint" may be implemented such that the expiry time of the breakpoint is registered with the delta timer, and there is no individual timer for that breakpoint. The triggers are mechanisms to start the timer for a breakpoint. Once the timer expires, the debugger should call the appropriate function.

The debugger starts the delta timer with an appropriate value of delta to control the precision of the timer. This timer can be set and started at the debugger initialization, or when the first trigger is reached. When a periodic timer is set, the operating system notifies the process whenever the timer expires. Similarly, in the case of a delta timer, the kernel notifies the debugger after every delta units of time.

The procedure that is called when the timer expires is called the handler procedure. The handler procedure is programmed according to the functionality expected by the application that is using the timer.

In the case of a debugger, this can be accounting the time that has elapsed, or performing check of whether a timer has expired. Optionally, the delta timer can be instructed to stop accounting time during a certain period. For example, the delta timer can be instructed to stop when the programmer wants to examine the program's state when a breakpoint is hit. Therefore, the delta timer keeps track of the time elapsed only when the timer is enabled to do so.

One implementation of a delta timer can involve the debugger installing a signal handler for an interval timer that expires every delta units of time. This handler is invoked when the kernel sends the signal to the debugger when the interval specified for the timer expires.

Figure 6:
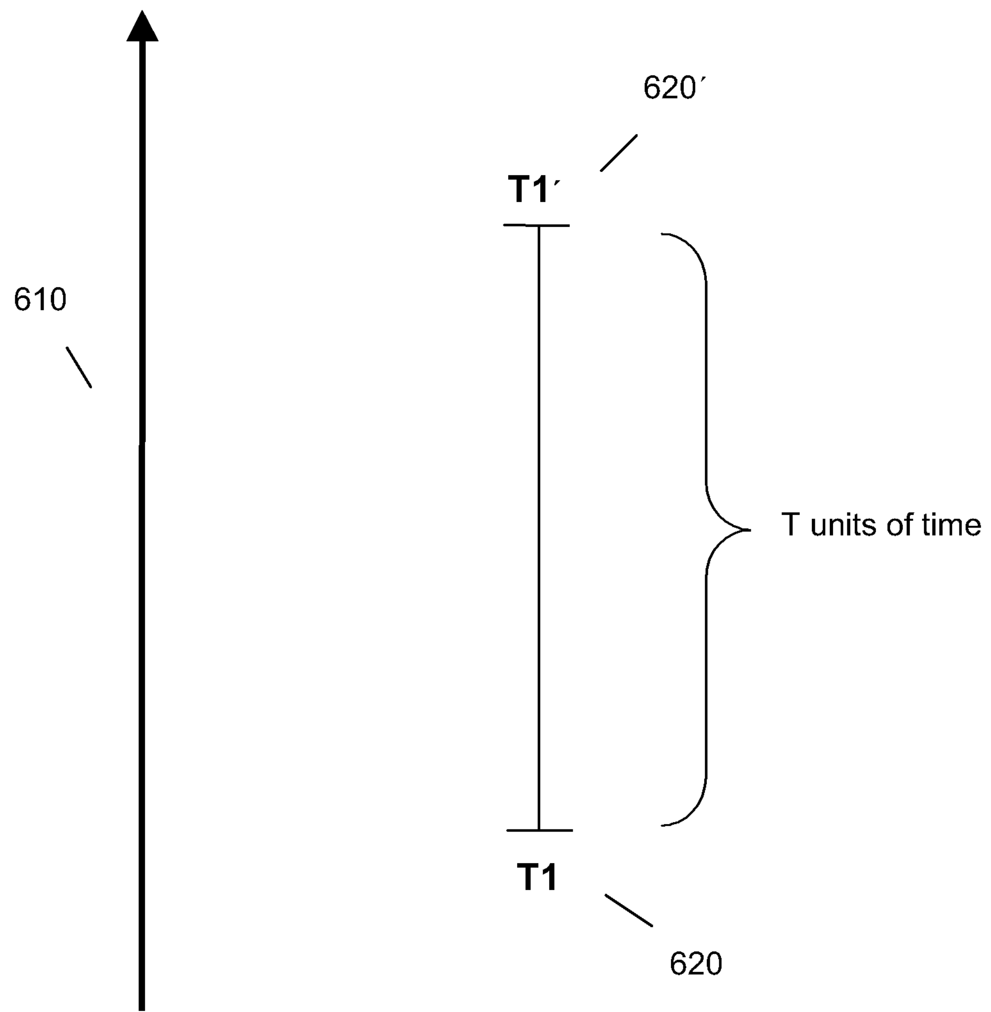
FIG. 6 is a schematic representation of an example in which program execution and a single time-based breakpoint is shown with respect to time.

FIG. 6 schematically represents a simple example in which the programmer chooses to place a single time-based breakpoint. There are no debugging interruptions during the child program's execution and therefore one can assume that the programmer did not place any other kinds of breakpoints, or the debugger disabled any such breakpoints when the trigger was encountered.

FIG. 6 includes a Time axis 610. The trigger is reached at the time T1 620 and the programmer wants the program to break at time T1' 620'. The expiry of the timer is T seconds. That is, T=T1'-T1.

As there is a single time-based breakpoint, the debugger starts the delta timer when the time is T1 and then keeps checking whether the time elapsed has reached T1'. When this happens, the debugger sends a signal to the child process to inform the child process to stop its execution. The state of the program can then be examined by the programmer.

This simple case involves no other debugging operations. If a debugger is designed such that all debugging operations are disabled and the time-based breakpoints are limited to one only, then a simple interval timer can replace the delta timer.

The interval timer starts accounting time when a trigger is encountered and notifies the debugger only when the timer expires. Upon receiving the notification, the debugger should suspend the child program's execution.

Figure 7:
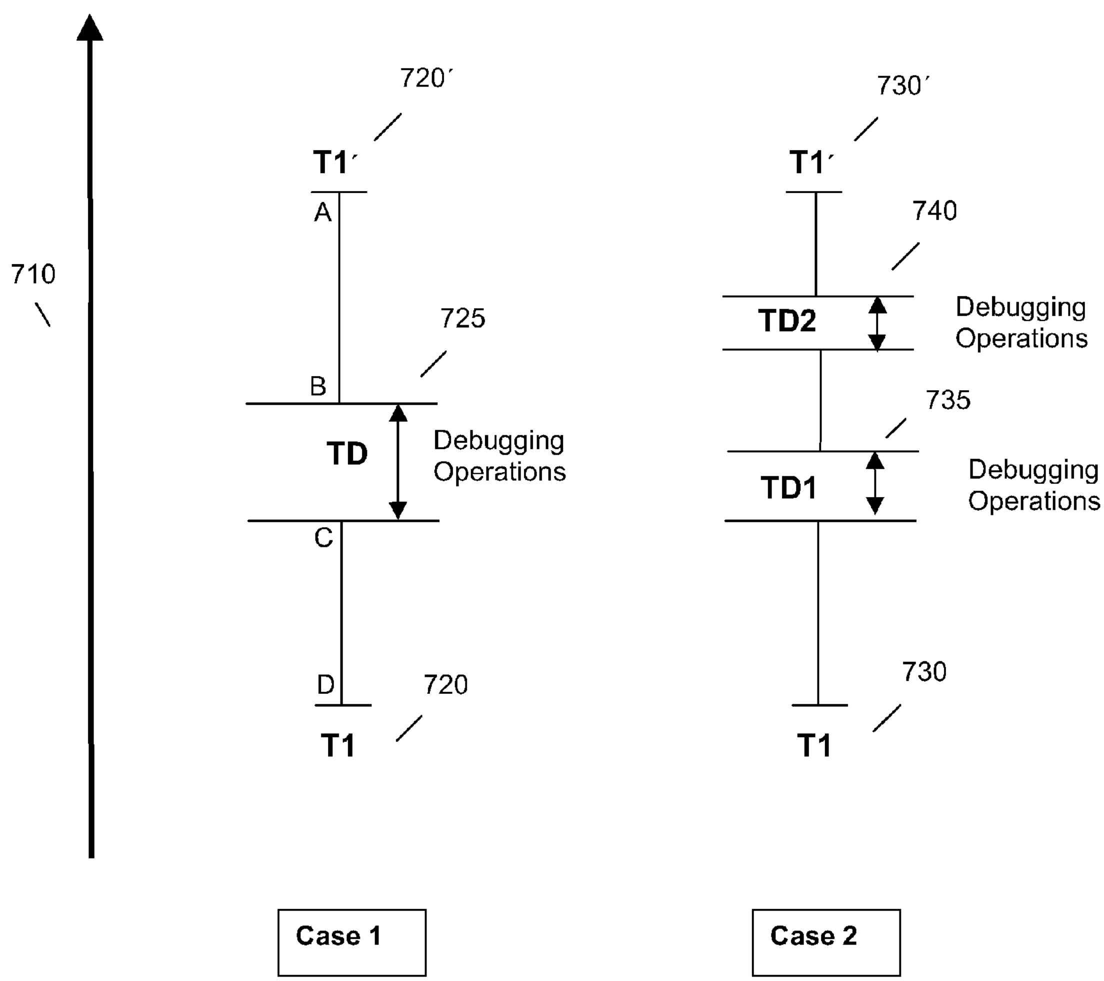
FIG. 7 is a schematic representation of an example in which program execution and a single time-based breakpoint is shown along with multiple debug operations with respect to time.

FIG. 7 schematically represents two cases that involve debugging operations while a program is being executed in the debugger. The first case has only one debugging operation between the time the trigger is reached and the time at which the program is to break.

The programmer may wish to disregard time spent during debugging. In the first case, the calculated time elapsed between T1 720 and T1' 720' is not simply the difference between these two times. This is because the relevant time also includes time TD 725 that is the time spent during debugging. Therefore, if the programmer chooses to disregard time TD 725, then the delta timer stops during the period when debugging operations are performed. Such a feature is desirable, especially if TD 725 is greater than T.

The second case involves two debugging sessions that take times TD1 735 and TD2 740. This second case is the same as the first case, except that debugging time is broken into two and distributed on the time axis 710. If the two debugging operations are replaced with a single debug operation such that TD=TD1+TD2, then both cases are essentially the same. If the delta timer is stopped during the debugging operations and then if a time graph is drawn for the delta timer, such a graph appears as that represented in FIG. 6, for the simple case of no debugging operations.

The time axes 610, 710 for FIGS. 6 and 7 represents only virtual time for which the timer accounts, and not real time that has elapsed. Thus, even if there are debugging operations between the times the trigger is reached and the time the programmer wants to break the program, the delta timer's time graph is equivalent to the case when there are no debugging operations at all. This is possible if there is a mechanism to stop the delta timer.

When the CPU time consumed acts as the expiry time, then the kernel does not account for time when a process is stopped under the control of the debugger. Therefore debugging operations do not affect this accounting. The "wall-clock" timer is that for which the programmer may want the timer to stop accounting during debugging operations.

Figure 8:
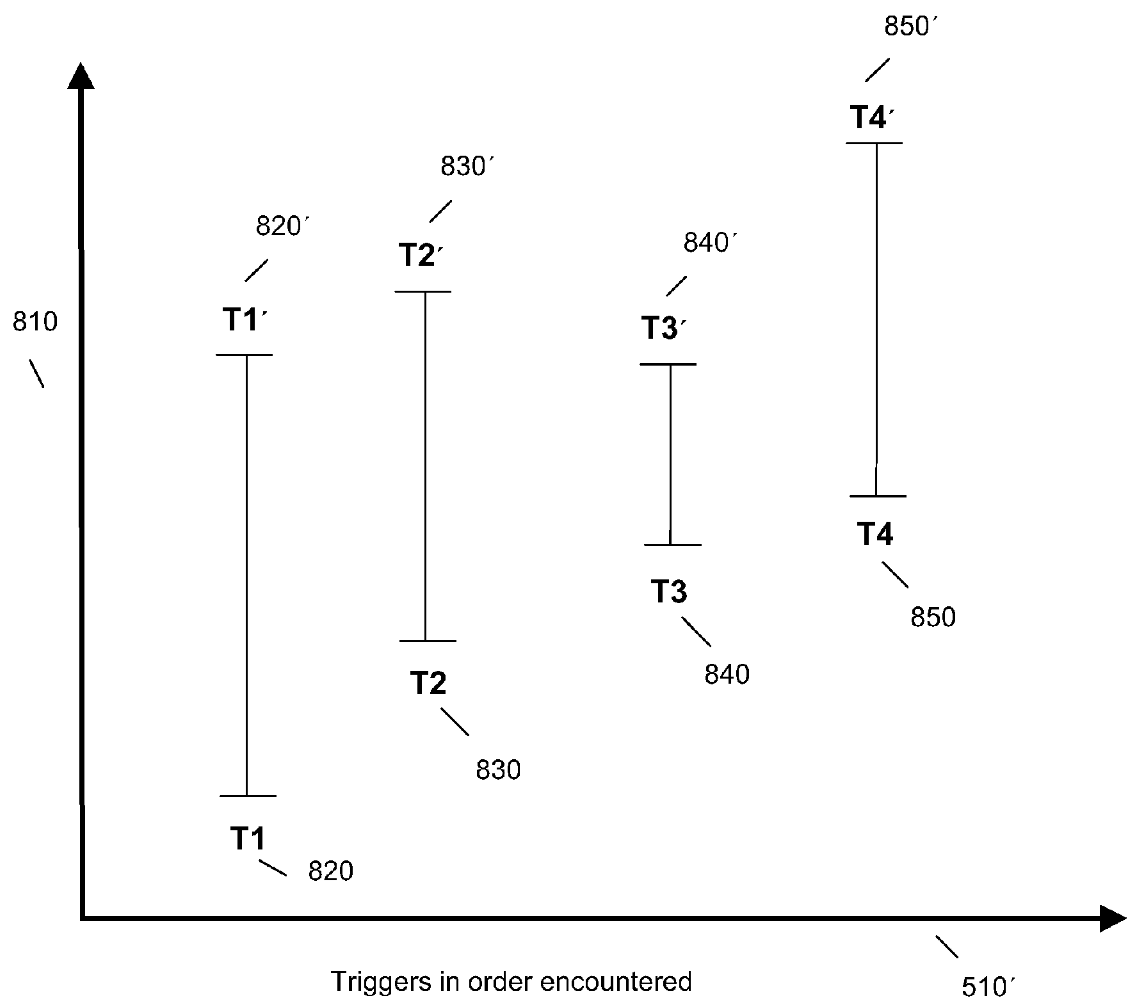
FIG. 8 is a schematic representation of an example in which a program execution and multiple time-based breakpoints are shown with respect to the time.

FIG. 8 schematically represents another example of multiple time-based breakpoints during the program's execution. The triggers are encountered in the order T1 820, T2 830, T3 840 and T4 850 along time axis 810. To account for multiple expiry times T1' 820', T2' 830', T3' 840' and T4' 850', the delta timer works on behalf of the trigger that has the earliest expiry time. In FIG. 8, the timer sets its expiry at the time T1' 820' when the timer first encounters the first trigger at time T1 820. When the second trigger is encountered, the expiry time does not change because T1' 820' is less than T2' 830'. For the third trigger, the timer re-adjusts its expiry time when the timer encounters the trigger at time T3 840'. This is because the expiry time of the third trigger (T3' 840') is less than the expiry time registered with the timer (T1' 820'). The fourth trigger has its expiry time at T4' 850' which is the highest of all expiry times. When the first expiry time is reached, the debugger takes appropriate action. The timer then readjusts its expiry time to T1' 820', which is now the minimum expiry time out of all the expiry times of the remaining three triggers.

As execution proceeds, the expiry times are set to T2' 830' and T4' 850' in that order. The changes in the expiry time of the timer are based on the fact that T3' 840'<T1' 820'<T2' 830'<T4' 850'. Therefore, the expiry time is re-adjusted whenever a trigger is encountered. As described above, if the program execution breaks, the delta timer's graph is the same as if no debug operations were present. This is possible if the timer stops accounting for time during those periods. Similarly, if such a timer is used in this case, then the time graph of the delta timer is as for FIG. 8.

The implementation of time-based breakpoints, and timers, can vary and the above cases may differ from the implementations described. The end goal in each case is to allow debuggers to suspend execution when a specified time has elapsed. If the programmer wants the timer to stop accounting for the time during the debug operations, then the debugger should notify the timer when to stop. This notification can be in the form of setting a Boolean flag or de-registering the timer's handler procedure and then re-registering the flag once the programmer chooses to continue the program execution. Kernels usually do not provide the facility of pausing timers. If, however, a kernel does provide this facility, the facility can be used by the debugger.

The timer may need to change its expiry time as explained earlier. Therefore, when a trigger is encountered, the new expiry time should be compared with the current one in order to decide which of the two should be used. The timer can also maintain a sorted list of the expiry times to choose the new expiry time when the current expiry time is reached. As one expiry time is being compared with another, care is taken so that all expiry times are based and compared with respect to a common time line. To this end, expiry times are registered with the timer.

A pseudocode example of a very simple handler procedure is presented in Table 5 below.

TABLE 5

```
Timer_Delta_handler ( )
{
if (Expiry Setting == WALL CLOCK)
  1. {
    (i) if timer is disabled then
    (ii) {
    (iii) /* do nothing and exit the handler */
    (iv) return;
    (v) }
    (vi) else
    (vii) {
    (viii) time elapsed = time elapsed + delta +
      CORRECTION;
    (ix) if time elapsed ≥ current expiry
    (x) {
      1. Notify the child program to suspend its
      execution.
      2. Timer_Disabled = TRUE;
      3. current expiry = get next expiry( );
    (xi) }
    (xii) }
  2. }
else if (Expiry Setting == CPU TIME )
{
if ( child's CPU time consumed == expiry time)
    (i) {
      1. Notify the child program to suspend its
         execution.
      2. expiry = get_next_expiry( );
    (ii) }
}
else if /* More cases */
}
```

The triggers and timers are necessary to start the timer and to keep track of the time that has elapsed. The action to be taken when the time elapses can be altered to obtain various types of time-based breakpoints. Instead of suspending program execution, a new breakpoint can be inserted after the time elapses. This provides the facility of a delayed breakpoint that remains dormant for a certain period. Debuggers insert breakpoints during the child program's startup or when the program is continued. To extend this idea further, by using the trigger—timer mechanism, all or some breakpoints can be enabled after some time. This allows the programmer define a "no breakpoint time zone" during which all breakpoints are suspended, or nonfunctional. Practically, the trigger-timer mechanism can be used if the debugger depends on the time elapsed to perform certain tasks while debugging a program.

Computer Hardware and Software

Figure 9:
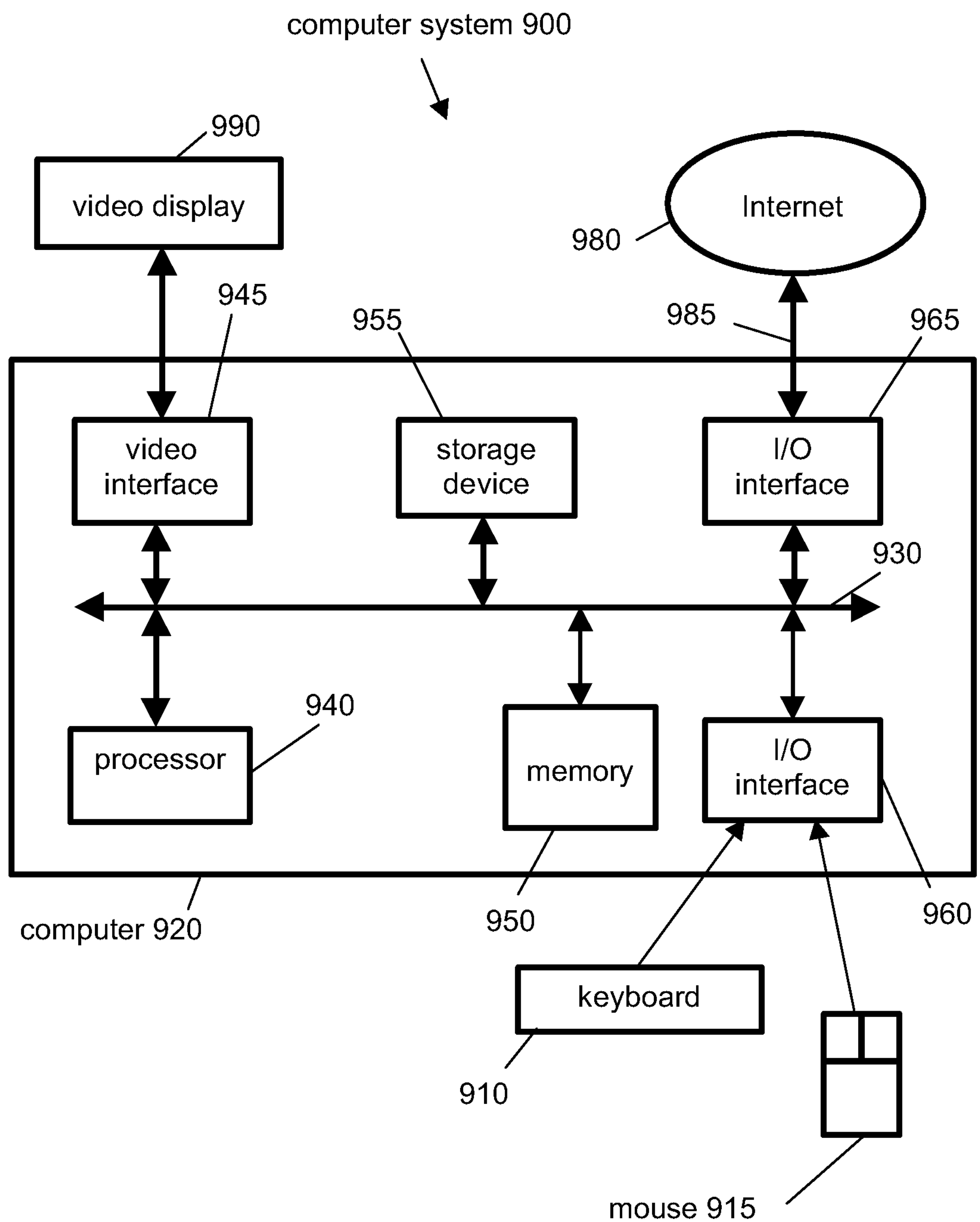
FIG. 9 is a schematic representation of a computer system suitable for performing the techniques described with reference to FIGS. 1 to 8.

FIG. 9 schematically represents a computer system 900 that can be used to perform steps in a process that implement the techniques described herein. The computer system 900 is provided for executing computer software that is programmed to assist in performing the described techniques. This computer software executes under a suitable operating system installed on the computer system 900.

The computer software involves a set of programmed logic instructions that are able to be interpreted by the computer system 900 for instructing the computer system 900 to perform predetermined functions specified by those instructions. The computer software can be an expression recorded in any language, code or notation, comprising a set of instructions intended to cause a compatible information processing system to perform particular functions, either directly or after conversion to another language, code or notation.

The computer software is programmed by a computer program comprising statements in an appropriate computer language. The computer program is processed using a compiler into computer software that has a binary format suitable for execution by the operating system. The computer software is programmed in a manner that involves various software components, or code means, that perform particular steps in the process of the described techniques.

The components of the computer system 900 include: a computer 920, input devices 910, 915 and video display 990. The computer 920 includes: processor 940, memory module 950, input/output (I/O) interfaces 960, 965, video interface 945, and storage device 955.

The processor 940 is a central processing unit (CPU) that executes the operating system and the computer software executing under the operating system. The memory module 950 includes random access memory (RAM) and read-only memory (ROM), and is used under direction of the processor 940.

The video interface 945 is connected to video display 990 and provides video signals for display on the video display 990. User input to operate the computer 920 is provided from input devices 910, 915 consisting of keyboard 910 and mouse 915. The storage device 955 can include a disk drive or any other suitable non-volatile storage medium.

Each of the components of the computer 920 is connected to a bus 930 that includes data, address, and control buses, to allow these components to communicate with each other via the bus 930.

The computer system 900 can be connected to one or more other similar computers via a input/output (I/O) interface 965 using a communication channel 985 to a network 980, represented as the Internet.

The computer software program may be provided as a computer program product, and recorded on a portable storage medium. In this case, the computer software program is accessed by the computer system 900 from the storage device 955. Alternatively, the computer software can be accessed directly from the network 980 by the computer 920. In either case, a user can interact with the computer system 900 using the keyboard 910 and mouse 915 to operate the programmed computer software executing on the computer 920.

The computer system 900 is described for illustrative purposes: other configurations or types of computer systems can be equally well used to implement the described techniques. The foregoing is only an example of a particular type of computer system suitable for implementing the described techniques.

Applications

Some programs exhibit performance problems after being executed for a relatively long time. The programmer may wish to place breakpoints for a certain function such that the program execution stops when the specified time is reached. Time-based breakpoints are desirable in such circumstances.

In other cases, a program may need to be debugged whenever a certain amount of time has elapsed due to an error in the logic of the product. An example can be a program that needs to debugged because it is not able to output any data after 3 hours of execution. Time-based breakpoints can also be of help in such cases.

Another example is any function that is hit many times for a certain period of time and after that the hits become less frequent. If the desired effect is to debug the function during the low hits, and if the time for which the hits is high is known, then the time-based breakpoints can come into effect during the low hits only. For example, consider an application for which a particular file is accessed frequently during the initial 10 seconds from the start of execution of the application. These 10 seconds represents the time the application takes to initialize.

After initialization is complete, the access to the file is not frequent, and is instead based on a user event. Now, consider a certain "buggy" part of the program may be reading the file incorrectly and this is a bug under investigation that needs to be resolved. This bug exists after the application has completed initialization. In such a case the programmer can set a breakpoint in the file access routine such that the breakpoint comes into effect after 10 seconds only, that is, once the application initialization is complete. Here the breakpoint is set after a delay of 10 seconds and the programmer need not break at the function during the initialization but only when the user event causes the application to access the file.

Consider a program that must be executed without interruption (even by breakpoints) for a predetermined time period (such as T seconds), as such uninterrupted operation is vital for the logic of the program to execute correctly. After executing for T seconds, the execution of the program can be interrupted. In such cases, the use of time-based breakpoints is desirable as one may not be able to judge the value of a variable at T seconds. Accordingly, time is in this case a more appropriate parameter for setting the breakpoint, compared with other possible parameter such as variable count.

The described implementation operates automatically without manual intervention from programmers, is accurate, and less prone to error than existing approaches.

Further Variations

The described technique of providing time-based breakpoints extends to the expiration of breakpoints when a user-specified time period elapses. The time calculation involved is similar to that described above. Such functionality is desirable if a user can determine that the breakpoint, when reached, is not needed after a certain time period has elapsed starting from the time when the program resumes execution. In this case, the timer is started when the execution is resumed and not when the breakpoint is first encountered. The timer keeps track of the time elapsed since the program resumed execution and if the breakpoint is not hit during the specified time, then the breakpoint is disabled. This allows a programmer to disable breakpoints by using time as a parameter with which to access the need for a breakpoint during the debugging session. The use of such a breakpoint depends on the logic of the program being debugged.

For example, if a programmer knows that a breakpoint is not of use unless the breakpoint is reached within ten seconds since the program resumed execution, then the programmer may choose to expire the breakpoint after ten seconds have elapsed. The action to be performed if the breakpoint is hit before the timer expires can vary depending on the implementations. One implementation, for example, may choose to proceed with expiry of the breakpoint even though the breakpoint was hit. Similarly, another implementation may choose to reset the timer, and start the timer once again when execution is resumed. A third implementation may choose to treat the breakpoint as any normal breakpoint if the breakpoint is hit before the time specified has elapsed. In any case, the breakpoint expires based on a measure of time, and not a count value.

The above can also be extended to a special kind of breakpoint that continues execution if there has been no user intervention (that is, input) during the monitored time period. For example, if the user has not pressed any key for three seconds since the breakpoint has been reached, then the program should continue rather than waiting for user input. This functionality can provide an aid to a programmer who wants to observe the execution of the program and wants to pause at a function to determine whether the function was reached. The timer keeps track of the time since the breakpoint was hit. If the time elapses without the programmer providing any user inputs, the debugger automatically resumes the execution of the program.

A breakpoint of this kind removes any need for the programmer to force the debugger to continue execution by providing a keyboard-based or mouse-based input.

This facility is of particular assistance to those programmers who use the debugger as a learning tool to understand the functionality of the program. Such functionality also allows the programmer to concentrate on other tasks, such as making notes on the execution of the program, or referring to a class chart diagram, or any other task that makes the required user input an inconvenience to the programmer.

Conclusion

A method, a computer system and computer software are described herein in the context of debuggers providing time-based breakpoints.

Various alterations and modifications can be made to the techniques and arrangements described herein, as would be apparent to one skilled in the relevant art.

What is claimed is:

1. A method for debugging a program upon expiration of a timer, the method comprising:

encountering via a processor a break exception during an execution of a program;

determining if the break exception is raised by a first trigger that has a first expiration time, or by a breakpoint;

in response to determining that the break exception is raised by the first trigger, breaking the program execution, starting a timer and resuming the program execution without passing control to a user interface thread;

in response to encountering a second break exception trigger and a third break exception trigger after starting the timer and resuming the program execution, wherein the second break exception trigger has a second expiration time that is different from the first expiration time and the third break exception trigger has a third expiration time that is different from the first and the second expiration times, setting an earliest of the first expiration time, the second expiration time and the third expiration time as a registered expiration time for the timer;

in response to the started timer reaching the registered expiration time, or in response to determining that the break exception is raised by the breakpoint, breaking the program execution, passing control to the user interface thread, performing a debugging operation, and resuming the program execution upon indication of the user interface thread;

in response to the started timer reaching the registered expiration time, resetting the registered expiration time for the timer to an earliest of the first expiration time, the second expiration time and the third expiration time that was not set as the registered expiration time for the timer, and restarting the timer; and breaking the program execution in response to the restarted timer reaching the reset registered expiration time.

2. The method of claim 1, wherein the starting the timer and resuming the program execution if determined that the break exception is raised by the first trigger further comprises:

periodically checking a central processing unit time allocated to the program execution; and wherein the timer expires when it exceeds the periodically checked central processing unit time allocated to the program execution.

3. The method of claim 2, further comprising:

replacing the break exception with an original instruction stored in a memory after starting the timer and before the resuming the program execution if the break exception is a software trigger; or disabling the break exception instruction in a hardware register if the break exception is a hardware trigger.

4. The method of claim 3, wherein the determining if the break exception is raised by the first trigger or by the breakpoint further comprises:

searching of a list of time-based trigger breakpoints for the break exception.

5. The method of claim 4, wherein the replacing the break exception with the original instruction stored in the memory after starting the timer and before the resuming the program execution if the break exception is a software trigger, further comprises:

executing the original instruction; and reinserting the break exception software trigger at a location of the break exception.

6. The method of claim 5, further comprising:

stopping the timer during a time period when a debugging operation is performed.

7. A computer system that debugs a program upon expiration of a timer, the computer system comprising:

a processing unit, computer readable memory and a computer readable storage system;

first program instructions to determine if a break exception encountered during an execution of a program is raised by a first trigger that has a first expiration time, or by a breakpoint;

second program instructions to, in response to determining that the break exception is raised by the first trigger, break the program execution, start a timer and resume the program execution without passing control to a use interface thread;

third program instructions to, in response to encountering a second break exception trigger and a third break exception trigger after starting the timer and resuming the program execution, wherein the second break exception trigger has a second expiration time that is different from the first expiration time and the third break exception trigger has a third expiration time that is different from the first and the second expiration times, set an earliest of the first expiration time, the second expiration time and the third expiration time as a registered expiration time for the timer;

fourth program instructions to, in response to the started timer reaching the registered expiration time, or in response to determining that the break exception is raised by the breakpoint, break the program execution, pass control to the user interface thread, perform a debugging operation and resume the program execution upon indication of the user interface thread; and fifth program instructions to, in response to the started timer reaching the registered expiration time, reset the registered expiration time for the timer to an earliest of the first expiration time the second expiration time and the third expiration time that was not set as the registered expiration time for the timer, restart the timer, and break the program execution in response to the restarted timer reaching the reset registered expiration time; and wherein the first, second, third, fourth and fifth program instructions are stored on the computer readable storage system for execution by the processing unit via the computer readable memory.

8. The computer system of claim 7, wherein the second program instructions are further to start the timer and resume the program execution if determined that the break exception is raised by the first trigger by:

periodically checking a central processing unit time allocated to the program execution; and wherein the timer expires when it exceeds the periodically checked central processing unit time allocated to the program execution.

9. The computer system of claim 8, wherein the second program instructions are further to:

replace the break exception with an original instruction stored in a memory after starting the timer and before the resuming the program execution if the break exception is a software trigger; or disable the break exception instruction in a hardware register if the break exception is a hardware trigger.

10. The computer system of claim 9, wherein the first program instructions are further to determine if the break exception is raised by the first trigger or by the breakpoint by:

searching of a list of time-based trigger breakpoints for the break exception.

11. The computer system of claim 10, wherein the second program instructions are further to replace the break exception with the original instruction stored in the memory after starting the timer and before the resuming the program execution if the break exception is a software trigger by:

executing the original instruction; and reinserting the break exception software trigger at a location of the break exception.

12. The computer system of claim 11, wherein the second program instructions are further to stop the timer during a time period when a debugging operation is performed.

13. A computer program product that debugs a program upon expiration of a timer, the computer program product comprising:

a computer readable storage medium;

first program instructions to determine if a break exception encountered during an execution of a program is raised by a first trigger that has a first expiration time, or by a breakpoint;

second program instructions to, in response to determining that the break exception is raised by the first trigger, break the program execution, start a timer and resume the program execution without passing control to a user interface thread;

third program instructions to, in response to encountering a second break exception trigger and a third break exception trigger after starting the timer and resuming the program execution, wherein the second break exception trigger has a second expiration time that is different from the first expiration time and the third break exception trigger has a third expiration time that is different from the first and the second expiration times, set an earliest of the first expiration time, the second expiration time and the third expiration time as a registered expiration time for the timer;

fourth program instructions to, in response to the started timer reaching the registered expiration time, or in response to determining that the break exception is raised by the breakpoint, break the program execution, pass control to the user interface thread, perform a debugging operation and resume the program execution upon indication of the user interface thread; and fifth program instructions to, in response to the started timer reaching the registered expiration time, reset the registered expiration time for the timer to an earliest of the first expiration time, the second expiration time and the third expiration time that was not set as the registered expiration time for the timer, restart the timer, and break the program execution in response to the restarted timer reaching the reset registered expiration time; and wherein the first, second, third, fourth and fifth program instructions are stored on the computer readable storage medium.

14. The computer program product of claim 13, wherein the second program instructions are further to start the timer and resume the program execution if determined that the break exception is raised by the first trigger by:

periodically checking a central processing unit time allocated to the program execution; and wherein the timer expires when it exceeds the periodically checked central processing unit time allocated to the program execution.

15. The computer program product of claim 14, wherein the second program instructions are further to:

replace the break exception with an original instruction stored in a memory after starting the timer and before the resuming the program execution if the break exception is a software trigger; or disable the break exception instruction in a hardware register if the break exception is a hardware trigger.

16. The computer program product of claim 15, wherein the first program instructions are further to determine if the break exception is raised by the first trigger or by the breakpoint by:

searching of a list of time-based trigger breakpoints for the break exception.

17. The computer program product of claim 16, wherein the second program instructions are further to:

replace the break exception with the original instruction stored in the memory after starting the timer and before the resuming the program execution if the break exception is a software trigger by executing the original instruction and reinserting the break exception software trigger at a location of the break exception; and stop the timer during a time period when a debugging operation is performed.

* * * * *